(12) United States Patent
Rogner

(10) Patent No.: US 8,839,930 B2
(45) Date of Patent: Sep. 23, 2014

(54) CONTROL DEVICE OF A ROTATING SHIFTING ELEMENT OF AN AUTOMATIC TRANSMISSION FOR ENGINE START-STOP OPERATION

(75) Inventor: Horst Rogner, Oberteuringen (DE)

(73) Assignee: ZF Friedrichshafen, Friedrichshafen (DE)

( * ) Notice: Subject to any disclaimer, the term of this patent is extended or adjusted under 35 U.S.C. 154(b) by 418 days.

(21) Appl. No.: 13/289,053

(22) Filed: Nov. 4, 2011

(65) Prior Publication Data

US 2012/0138412 A1  Jun. 7, 2012

(30) Foreign Application Priority Data

Dec. 1, 2010 (DE) .......................... 10 2010 062 247

(51) Int. Cl.
*F16D 25/0635* (2006.01)
*F16D 13/04* (2006.01)

(52) U.S. Cl.
USPC ................ 192/70.22; 192/85.25; 192/85.39; 192/114 R

(58) Field of Classification Search
USPC ................ 192/70.11, 70.22, 85.2, 85.25, 192/85.37–85.39, 92, 114 R
See application file for complete search history.

(56) References Cited

U.S. PATENT DOCUMENTS

| 5,168,975 | A | 12/1992 | Bernhardt et al. |
| 8,074,778 | B2 * | 12/2011 | Jayaram et al. ........... 192/114 R |
| 8,109,376 | B2 * | 2/2012 | Bek ............................ 192/70.22 |
| 2008/0264746 | A1 * | 10/2008 | Simpson et al. ............ 192/3.33 |

FOREIGN PATENT DOCUMENTS

| DE | 41 34 268 A1 | 4/1992 |
| DE | 10 2006 012 838 A1 | 11/2006 |
| DE | 10 2006 014 759 A1 | 10/2007 |
| DE | 10 2007 003 922 A1 | 10/2008 |
| WO | 2007/118500 A1 | 10/2007 |

* cited by examiner

*Primary Examiner* — David D. Le
*Assistant Examiner* — Jacob S Scott
(74) *Attorney, Agent, or Firm* — Davis&Bujold, PLLC; Michael J. Bujold

(57) ABSTRACT

A device for controlling a rotating shifting element of an automatic transmission for a start/stop operation. The shifting element is actuated by an axially moving piston which is biased, in a disengaging direction, by a spring and biased, in an engaging direction, by hydraulic pressure supplied to a pressure space. At least one spring-loaded latch, which is able to move in the radial direction, is arranged in the pressure space. The spring-loaded latch, when the combustion engine is operating, rotates with the piston and acts upon the piston such that if the engine stops, the previously engaged shifting element is locked by spring force and, as the pressure decreases, the shifting element disengages, at most only slightly, and when the engine is re-started, the locking action is again released by centrifugal force, in opposition to the spring force, so that the piston remains engaged during the hydraulic pressure build-up in the pressure chamber.

10 Claims, 2 Drawing Sheets

CONTROL DEVICE OF A ROTATING SHIFTING ELEMENT OF AN AUTOMATIC TRANSMISSION FOR ENGINE START-STOP OPERATION

This application claims priority from German patent application serial no. 10 2010 062 247.8 filed Dec. 1, 2010.

FIELD OF THE INVENTION

The invention concerns a device for controlling a rotating shifting element of an automatic transmission for start-stop operation, according to the preamble of claim 1.

BACKGROUND OF THE INVENTION

To reduce fuel consumption, emissions of harmful substances and noise levels in vehicular traffic, start-stop systems in which when the vehicle is stationary the internal combustion engine is automatically stopped and then automatically started again as soon as a wish to drive on again is recognized, are gaining importance. To enable this function in an automatic transmission in which, to supply the shifting elements with pressure and cooling oil, a hydraulic pump is driven by the internal combustion engine, the shifting clutches or shifting brakes required for a starting gear must already be active or even closed when the internal combustion engine is stopped or at least at a time very close to the re-starting of the internal combustion engine. In this way it can be ensured that a conventional hydraulic pump is capable, during a quick engine start when the hydraulic fluid volume demand is only small, of supplying the shifting elements with sufficient oil pressure for rapid torque transmission. Otherwise, starting up for example after a traffic-light shift would be delayed and the start-stop function would be impractical and uncomfortable.

However the shifting pistons of the shifting elements, which are usually spring-loaded in the opening direction, open completely as soon as the hydraulic pressure falls when the engine and pump are at rest. A considerably more powerful and as such oversized hydraulic pump, which could build up the necessary pressure quickly enough for starting when the shifting piston is open and has moved back to a rear end position, would eliminate the fuel consumption advantage of the start-stop system again due to its permanently higher power uptake during driving operation, and would therefore have a rather counterproductive effect.

In order nevertheless to enable start-stop operation with an automatically controlled transmission, in particular, an automatic transmission of planetary design, it is known for example from DE 10 2006 012 838 A1 and DE 41 34 268 C2 to use an auxiliary pump with its own electric drive which operates when the engine is stopped, in order to maintain at least a permanent feed pressure for the shifting elements provided for starting.

The disadvantages of an auxiliary electric pump are the structural complexity and costs involved, the continuous power uptake and the acoustically perceptible pump operation of the auxiliary pump when the engine is at rest.

Furthermore a hydraulic impulse storage device (HIS) is known, which supplies the shifting elements of a transmission required for starting with hydraulic oil. WO 2007/118 500 A1 shows an impulse storage device of this type in the form of a piston store. During driving operation the piston store is filled with oil against the force of a spring, and mechanically locked. When the engine is restarted the lock is released, for example by means of an electromagnetically controlled actuator, and the stored oil is expelled by the spring-loaded piston and fed into the hydraulic system to assist the pressure build-up of the hydraulic pump and the pressurization of the corresponding shifting elements. This takes place so quickly that when the engine starts the shifting elements concerned are already active, so that the driver does not perceive any delay in the build-up of force in the drivetrain. Compared with an electric pump such an impulse store is cheaper and more economical to operate. The disadvantages of an impulse store are the necessary structural complexity and fitting space it demands, and the corresponding control effort involved.

From DE 10 2006 014 759 A1 a hydraulic control device is known, with which the shifting elements relevant for a start-stop function are prevented from opening by hold-back valves when the engine is at rest. The hold-back valve is arranged as a pressure-limiting means in a hydraulic branch between a shifting element valve and a shifting element piston space in order to prevent empty running of the piston space in an active engine-start automatic mode, so that at least a residual volume remains for compensating a ventilation play. For this purpose the hold-back valve closes at a defined residual pressure of the hydraulic pump switched off when the shifting element is closed, which is somewhat lower than a shifting element filling pressure.

The disadvantage in this case is that the control device is better able to maintain a required minimum pressure for a given time in shifting elements attached to a housing with statically pressure-tight oil ducts, i.e. in shifting brakes. In contrast for rotating shifting elements with dynamic, leak-prone seals, i.e. shifting clutches, with comparable seal complexity the control device is in any case suitable for short engine stop times. Besides, the structural and control complexity and cost of the hold-back valves are not inconsiderable.

From DE 10 2007 003 922 A1 a shifting element of an automatic transmission is known, in which a pressure compensation space of a shifting element piston is designed as a dynamic restoring means. The pressure compensation space compensates the control forces on the piston usually produced centrifugally by rotating oil in the piston pressure space, and in addition produces a resulting restoring force which replaces a conventional restoring spring. However, in contrast to a restoring spring the restoring force of the compensation space only acts on the piston when the shifting element is rotating. When the internal combustion engine and transmission are stopped, the piston no longer rotates when the vehicle is at rest. Consequently, despite the falling hydraulic pressure, owing to the absence of the restoring force the piston remains in a forward end position, i.e. almost fully activated. On re-starting, only a small oil volume then has to be replaced, so that the shifting pressure required for a starting process is available in a time short enough for start-stop operation.

The disadvantage in this case is that for the formation of a pressure space that will have sufficiently reliable restoring characteristics with all the hydraulic fluid properties that may occur, a suitably sized structural space, in particular one or more annular hollow spaces, are needed. However, in modern transmissions with in any case restricted structural space and sometimes with design limitations, the space required is not always available. Moreover, the pressure compensation space must in each case be accurately matched to the shifting element concerned, which entails corresponding effort and expense.

SUMMARY OF THE INVENTION

Against this background the purpose of the present invention is to provide a device for controlling a shifting element of an automatic transmission for start-stop operation, which is simply designed, takes up little space, and is inexpensive.

The invention is based on the recognition that with the help of a simple, mechanical, centrifugal-force-controlled holding device which is coupled to the rotation of a clutch that is pre-stressed in the opening direction and that closes hydraulically, in start-stop operation when the engine stops the complete opening of the clutch closed before the engine stops can be prevented, in order, on restarting, to enable delay-free starting by virtue of a rapid re-establishment of the torque transmission at the clutch. For this a return movement of the clutch piston, brought about when the engine stops by a pressure reduction of the transmission oil pump conventionally coupled to the engine, should be limited to a minimum, since when there is no rotation the holding device locks the clutch piston by spring force, whereas during engine operation, as a result of centrifugal force produced by the rotation it remains in a retracted, inactive position.

Accordingly, the invention starts from a device for controlling a rotating shifting element of an automatic transmission for start-stop operation, such that to supply the transmission with pressure and cooling oil a hydraulic pump is driven by an internal combustion engine, and such that the shifting element can be actuated by an axially movable piston acted upon in the opening direction by spring means that exert a spring force and which, in the closing direction, can be acted upon hydraulically via a pressure space.

To achieve the stated objective the invention provides that in the pressure space there is arranged at least one spring-loaded latch device which is fixed in the axial direction on a hub but can move in the radial direction, which when the internal combustion engine is running rotates together with the piston and which acts upon the piston in such manner that if the engine stops, the previously closed shifting element is locked by spring force, so that when the hydraulic pressure falls the shifting element opens at most only slightly, and when the engine is re-started the locking is released again against the spring force by virtue of centrifugal action whereby, owing to the hydraulic pressure building up on the piston in the pressure space, the shifting element remains closed or is completely closed again.

'Automatic transmission' is understood to mean in particular an automatic transmission of planetary design. Basically however, the object of the invention is also suitable for semi-automatic transmissions.

The arrangement according to the invention provides a simple, mechanical, centrifugal-force-controlled clutch holding device which, on a rotating shifting element such as a wet-operating disk clutch, prevents the complete opening of the shifting element during start-stop operation and thus quickly restores the ability of the shifting element to transmit torque when the engine is re-started. With a rotating clutch it offers the same advantages as the known impulse storage device, but with further reduced costs and structural complexity.

The device works as an automatic locking mechanism by virtue of the centrifugal force produced as a result of the rotation of the clutch. Thus, no external control means are required for its actuation. Rather, apart from start-stop situations in which, until the pressure surge, the shifting element equipped for start-stop operation is kept closed or almost closed at first hydraulically and then according to the invention mechanically, in all other operating situations the locking mechanism is inactive and has no influence on other functions. It is appropriate for all rotating shifting elements that are relevant for start-stop operation to be equipped with this device.

In a preferred embodiment of the invention a plurality of latch devices can be provided in one shifting element, individually or in groups, distributed symmetrically around the hub. This ensures a uniform circumferential distribution of the supporting or holding force on the shifting element piston.

Advantageously, pockets are formed in the pressure space, in which the radially movable, spring-loaded latches are located, the pockets having contact surfaces against which the latches can rest, and the latches having contact surfaces against which the axially movable, sprung piston can rest in the clutch opening direction when in the locked position.

To provide simple means for spring-loading the latches a receiving bore can be formed in each latch, in which in each case a helical compression spring is inserted, which rests between a radially outer boundary or contact surface of the pocket and a radially inner bottom of the receiving bore.

Furthermore, means for the compensation of adjustment path variations of the shifting element can be provided on the latches and/or on the piston.

In particular it can be provided that the contact surfaces of the latches are arranged in various axial positions. For example, it is possible to have a system of latches arranged distributed symmetrically in groups, with different axial positions of the contact surfaces for the piston to be held.

This allows wear-related or operating-condition-related control path variations of the shifting element to be taken into account, so that only slight opening movements of the shifting element can always be ensured and in order to enable the rapid hydraulic re-filling and establishment of the torque transmission of the shifting element for the starting process in start-stop operation. Thanks to the group arrangement, uniform circumferential contacting of the piston is always ensured.

A compensation of control path variations which has a comparable effect can also be achieved if the respective contact surfaces of the latches and corresponding contact surfaces of the piston are formed as conical contact surfaces.

The functional mode of the device according to the invention in combination with a correspondingly designed clutch is as follows:

While the engine is running, i.e. at least above an idling speed, the latches are pushed radially outward into the pockets under the action of the centrifugal force, and are therefore inactive. If the engine stops with the start-stop function activated, the clutch is kept closed hydraulically for as long as pressure is still being produced by the hydraulic pump. Below a certain rotation speed threshold the latches, by virtue of their spring loading, are pushed toward the hub or shaft center of the clutch, overcoming the centrifugal force which has decreased since the clutch rotation is slower, and so they form a stop for the piston. The spring loading of the latches is designed such that they fall into their locking position before the clutch piston has moved clear of the friction elements of the clutch and can move back under its own spring loading. Thus, below a certain pressure when the pump stops the clutch opens at most only slightly before the piston encounters the stop.

In the case when the engine stops while the start-stop function is deactivated, the clutch is opened conventionally in idling mode, i.e. it is depressurized, so that due to its spring loading, usually by a cup spring, the piston moves back completely already in idling mode to a rear end position while, due to centrifugal force, the latches are still in their outward position in the pockets. The pockets and piston hold back the latches in this open position of the clutch so that when the engine is switched off, i.e. when there is no longer any centrifugal force at all, the latches cannot fall into the locking position. Thus, when the start-stop function is switched off the latches are always inactive and without influence on the control of the clutch.

BRIEF DESCRIPTION OF DRAWINGS

To clarify the invention the description is attached, of a drawing of an example embodiment which shows.

DETAILED DESCRIPTION OF THE PREFERRED EMBODIMENTS

Figure 1:
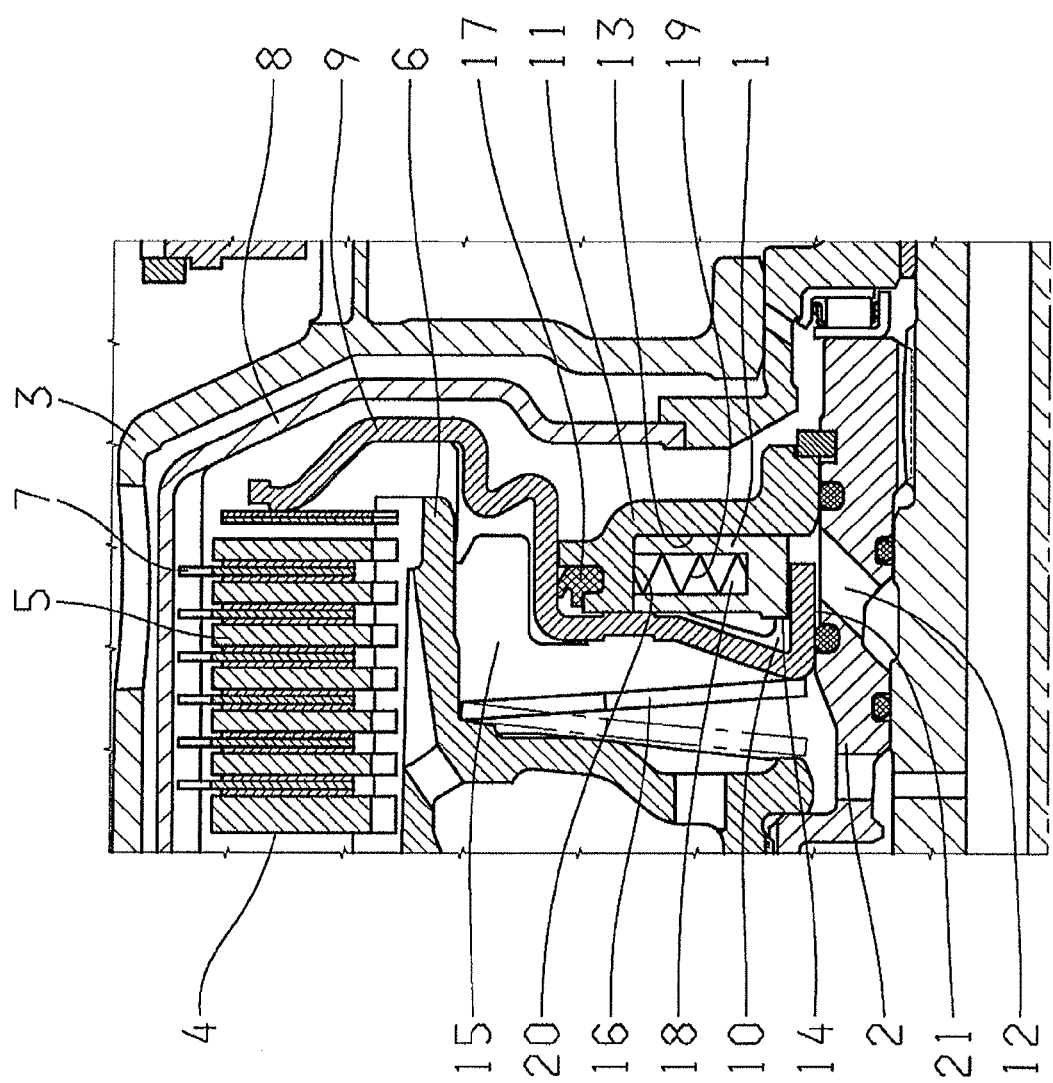
FIG. 1: A shifting element of an automatic transmission in the open condition with a device according to the invention, shown in longitudinal section.

Thus, in FIG. 1 a shifting element in the form of a disk clutch for shifting gear ratios in an automatic transmission known per se, for example one from the 8HP series by the present applicant, is equipped with a centrifugal-force-controlled latch 1 which forms a clutch holding device during start-stop operation.

The disk clutch is arranged on a hub 2 or shaft driven by an internal combustion engine (not shown). A hydraulic pump (not shown) driven by the internal combustion engine supplies the disk clutch with pressure and cooling oil via a central hydraulic supply system, no further details of which are given here. The disk clutch comprises a disk packet 4 arranged in a housing 3 inside the transmission, whose inner disks 5 are carried by an inner disk carrier 6 connected to the hub 2, and whose outer disks 7 are carried by an outer disk carrier 8. The disk packet 4 can be actuated by a piston 9 which can move axially on the hub 2.

A pressure space 10 for acting hydraulically on the piston 9 in the closing direction is delimited by a cylinder 11 that extends in the radial direction and is arranged axially fixed on the hub 2, by the hub 2 itself and by the clutch piston 9. Relative to the hub 2, the cylinder 11 and the piston 9 are sealed by sealing means, no further details of which are given here. In addition a sealing ring 17 is provided for sealing the cylinder relative to the piston 9. The pressure space 10 is connected hydraulically with the central oil supply by a pressure-medium line 12. By building up the pressure in the pressure space 10 the piston 9 or a thrust element thereof is pushed against the disk packet 4, whereby the inner and outer disks 5, 7 move relative to and are pressed against one another, so that frictional force is produced between them and the disk clutch is closed.

Inside the cylinder 11 is formed a pocket 13 into which the pin-like latch 1, rectangular in longitudinal section, is fitted with positive interlock and can move radially. Thus, in relation to rotation the latch 1 is coupled with the clutch piston 9. On its radially inner side the latch 1 has a contact surface 14 that projects axially toward the piston, which acts as a piston stop. Furthermore, a receiving bore 18 is formed in the latch 1, into which a helical compression spring 19 is inserted. The spring 19 rests radially outwardly against a contact surface 20 of the pocket 13 and radially inwardly against the bottom of the receiving bore 18.

A plurality of such latches 1 with associated pockets 13 are arranged distributed in groups symmetrically around the hub 2 in the pressure space 10, in such manner that the axial positions of the stops 14 of the groups vary somewhat, so as if necessary to compensate wear-related control path variations of the piston 9.

Opposite the pressure space 10 is formed a pressure compensation space 15 for the compensation of displacement forces on the piston 9 produced by rotating oil. In the compensation space 15 are arranged pre-stressed spring means 16 in the form of a cup spring, as a restoring element for spring-loading the piston 9 in the opening direction.

In the open condition of the clutch shown in FIG. 1, i.e. when the piston 9 is pushed back by the cup spring 16, an axially extending inner section 21 of the piston 9 engages behind the latch 1 on its inner side so that the latch 1 is held in the retracted condition, i.e. with the helical compression spring 19 stressed. This corresponds to the engine at rest situation without the start-stop function or the situation of the operation with the clutch open.

Figure 2:
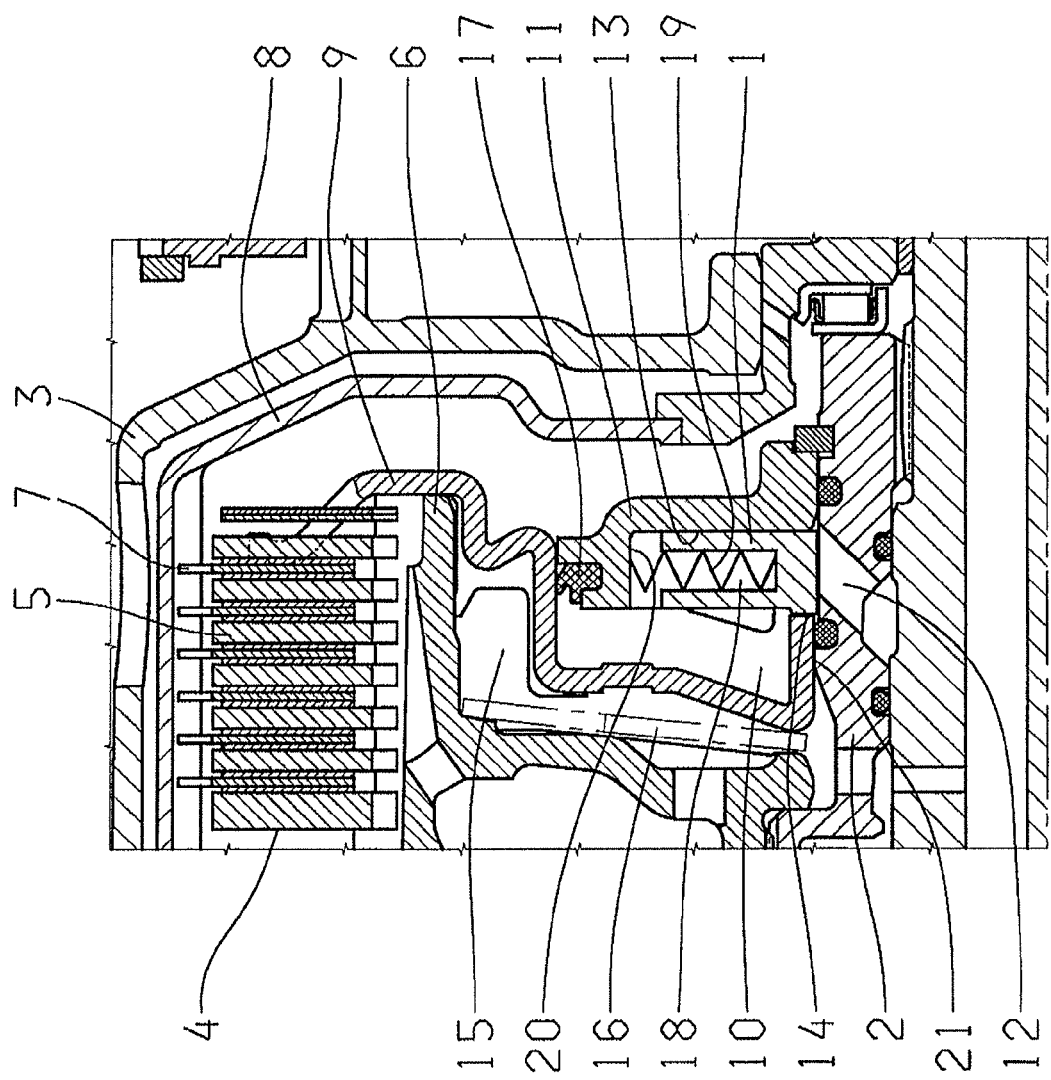
FIG. 2: The shifting element of FIG. 1 when the engine has stopped and the start-stop function is activated, in the mechanically locked condition.

FIG. 2 shows the engine at rest situation with the start-stop function. In this case the latch 1 is pushed toward the center of the hub, so the stress in the compression spring 19 is relieved. With its free end the piston section 21 rests against the latch stop 14, so the piston 9 is locked against moving back and away from the disk packet 4 and the clutch is in any event opened only slightly.

The automatic control or adjustment of the latch 1 is based on the engine-speed-dependent centrifugal forces during the rotation of the clutch when the engine is running. The centrifugal force acting on the latch 1 overcomes the spring force of the compression spring 19 pushing it toward the hub, so that it moves away from the center of the hub and, already at engine speeds from idling speed and above, comes to rest radially toward the outside in the pocket 13 associated with it.

If the engine stops without the start-stop function, as shown in FIG. 1, already at the idling speed the clutch is depressurized in the conventional manner and is therefore fully opened by the cup spring 16. The piston section 21 engages behind the latch 1 so that the control movement of the latter in the direction toward the hub 2 is blocked. Thus, there is no gap into which the latch 1 could fall radially inward when the engine stops.

If the engine stops with the start-stop function activated, as shown in FIG. 2, the clutch remains hydraulically closed until the pressure in the pressure space 10 falls. Since when the engine has stopped and the vehicle is at rest not only is the pump not being driven but also the clutch is not rotating, the compression spring 19 pushes the latch 1 radially inward toward the hub 2. Before the cup spring 16 overcomes the decreasing hydraulic pressure and the clutch piston 9 moves back, owing to the decreasing centrifugal forces the latch 1 has already moved radially inward so that the movement of the piston in the opening direction is blocked and the friction elements of the disk packet 4 are still positioned nearly against one another. When the engine is re-started the pump only has to replenish the pressure space 10 with a small oil volume in order to re-establish the closing pressure of the clutch. Thus, the clutch can transmit the engine torque again and the starting process can be carried out without perceptible delay. Owing to the simultaneous build-up of the centrifugal force the latch 1 moves clear of the hub 2 and is pushed back again to its released, inactive position in the latch pocket 13. Thus, in start-stop operation the latch 1 is active, since when the engine stops the clutch is held closed, first hydraulically and thereafter mechanically, until the hydraulic pressure increases, and is otherwise inactive.

INDEXES

1 Latch
2 Hub
3 Housing

4 Disk packet
5 Inner disks
6 Inner disk carrier
7 Outer disks
8 Outer disk carrier
9 Piston
10 Pressure space
11 Cylinder
12 Pressure-medium line
13 Pocket
14 Contact surface
15 Pressure compensation space
16 Spring means
17 Sealing ring
18 Receiving bore
19 Helical compression spring
20 Contact surface
21 Piston section

The invention claimed is:

1. A device for controlling a rotating shifting element of an automatic transmission for a start-stop operation, to supply the transmission with pressure and cooling oil,
 a hydraulic pump being driven by an internal combustion engine,
 the shifting element being actuated by an axially moving piston (9) which is acted upon, in a disengaging direction, by a spring force of a spring (16) and which is acted upon, in an engaging direction, by hydraulic pressure in a pressure space (10),
 at least one spring-loaded latch (1), which is fixed in an axial direction on a hub (2) and is guided and movable in a radial direction, being arranged in the pressure space (10),
 when the internal combustion engine is running, the at least one spring-loaded latch (1) rotates together with the piston (9) and acts upon the piston (9) such that if the engine stops, the previously engaged shifting element is locked by virtue of a spring force so that as the hydraulic pressure decreases, the shifting element disengages, at most only partially, and when the engine is re-started, the locking action is released by an effect of centrifugal force, in opposition to the spring force, such that the piston (9) of the shifting element remains engaged, or is again fully engaged, due to the hydraulic pressure build-up in the pressure chamber (10).

2. The device according to claim 1, wherein a plurality of latches (1), either singly or in groups, are distributed symmetrically around the hub (2).

3. The device according to claim 1, wherein the pressure space (10) is formed into pockets (13) into which a respective at least one spring-loaded latch (1) is located, and each latch (1) has a contact surface (14) against which the spring-loaded piston (9), in the locked position, abuts in the disengaging direction.

4. The device according to claim 3, wherein for the spring-loading of the latches (1), a receiving bore (18) is formed in each one of the latches (1), into which is inserted a helical compression spring (19), and the helical compression spring (19) abuts against a radially outer contact surface (20) of the respective pocket (13) and against a radially inner bottom of the receiving bore (18).

5. The device according to claim 3, wherein the contact surfaces (14) of the latches (1) are arranged at various axial positions.

6. The device according to claim 1, wherein a contact surfaces for compensating control movement variations of the shifting element are arranged on at least one of the latches (1) and on the piston (9), the contact surfaces of the latches are arranged at different axial positions such that the contact surfaces of the latches abut and hold the piston at different axial positions.

7. The device according to claim 6, wherein the contact surface of the latch and a contact surface of the piston comprise conical contact surfaces.

8. The device according to claim 1, wherein the shifting element is a wet-operating disk clutch.

9. The device according to claim 1, wherein the device is built into all the rotating shifting elements that are associated for start-stop operation.

10. A device for controlling a rotating shifting element of an automatic transmission for a start-stop operation, to supply the transmission with pressure and cooling oil,
 a hydraulic pump being driven by an internal combustion engine,
 the shifting element being actuated by an axially moving piston (9) which is acted upon, in a disengaging direction, by a spring force of a spring means (16) and which is acted upon, in an engaging direction, by hydraulic pressure in a pressure space (10),
 at least one spring-loaded latch (1), which is fixed in an axial direction on a hub (2) and is guided and movable in a radial direction, being arranged in the pressure space (10),
 when the internal combustion engine is running, the at least one spring-loaded latch (1) rotates together with the piston (9) and acts upon the piston (9) such that if the engine stops, the previously engaged shifting element is locked by virtue of a spring force so that as the hydraulic pressure decreases, the shifting element disengages, at most only partially, and when the engine is re-started, the locking action is released by an effect of centrifugal force, in opposition to the spring force, such that the piston (9) of the shifting element remains engaged, or is again fully engaged, due to the hydraulic pressure build-up in the pressure chamber (10).

* * * * *